Nov. 13, 1951  L. B. FORMAN  2,574,821
BRAKE HOLDING DEVICE AND VACUUM SWITCH
ACTUATED CONTROL CIRCUIT THEREFOR
Filed Dec. 22, 1947  2 SHEETS—SHEET 1
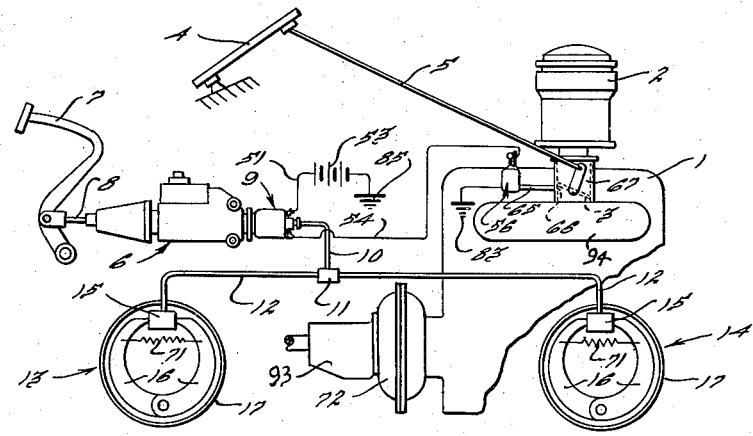
Fig. 1.
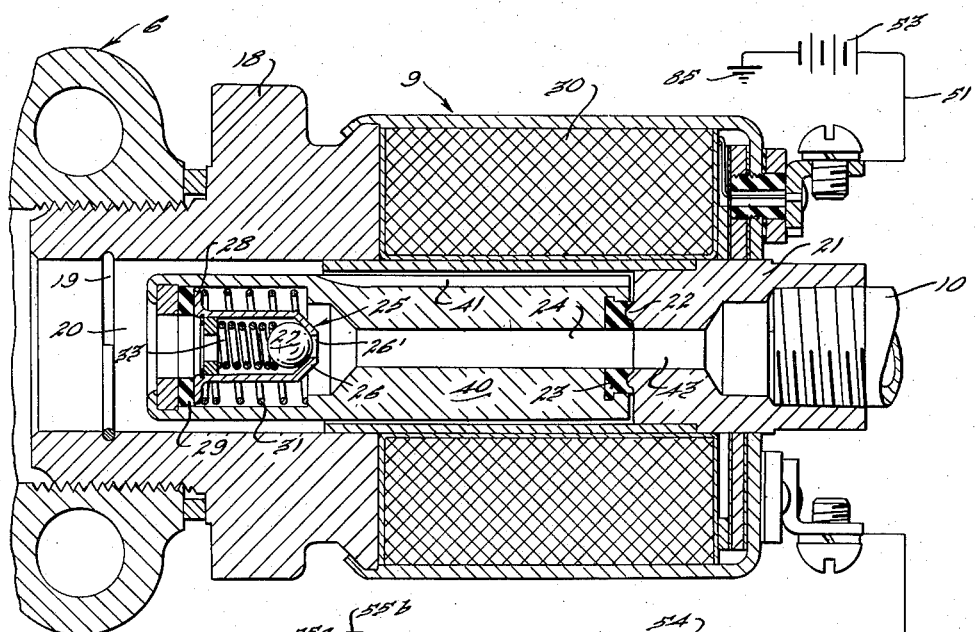
Fig. 2.
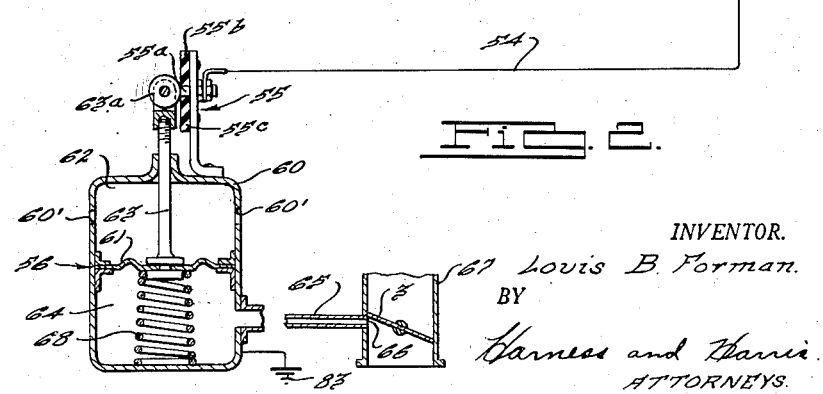
INVENTOR.
Louis B. Forman.
BY
Harness and Harris
ATTORNEYS.

Nov. 13, 1951  L. B. FORMAN  2,574,821
BRAKE HOLDING DEVICE AND VACUUM SWITCH
ACTUATED CONTROL CIRCUIT THEREFOR
Filed Dec. 22, 1947  2 SHEETS—SHEET 2

INVENTOR.
Louis B. Forman.
BY
Harness and Harris
ATTORNEYS.

Patented Nov. 13, 1951

2,574,821

UNITED STATES PATENT OFFICE 2,574,821

BRAKE HOLDING DEVICE AND VACUUM SWITCH ACTUATED CONTROL CIRCUIT THEREFOR

Louis B. Forman, Detroit, Mich., assignor to Chrysler Corporation, Highland Park, Mich., a corporation of Delaware Application December 22, 1947, Serial No. 793,290

10 Claims. (Cl. 188—152)

This invention relates to a control device particularly adapted for use as a control means for a no-creep device intended for motor vehicles equipped with a fluid drive and a fluid pressure actuated brake system, the device being completely automatic in its method of operation.

The invention relates particularly to a control means which will automatically hold the vehicle brakes applied, under certain predetermined conditions, the brake holding device being controlled by a single pressure sensitive switch which is responsive to vehicle and engine speed. Various forms of no-creep control mechanisms having two or more control switches are known to be old in the art but the accurate control of a no-creep system by means of a single, simplified, vacuum controlled switch is thought to be novel.

It is one of the objects of my invention to provide a simple, efficient, no-creep device which will automatically prevent a motor vehicle equipped with a fluid drive from unexpectedly moving forward after the vehicle has been brought to a stop with the engine running and the transmission in gear.

It is another object of my invention to provide a simplified form of control mechanism for an engine-driven device which mechanism is responsive to engine and/or vehicle speed and which may be operated by a single vacuum controlled switch connected to the engine carburetor. This control mechanism is also readily adaptable to automatically control the operation of any mechanisms associated with or dependent upon engine and/or vehicle speed.

It is a further object of the present invention to provide a brake control device which will hold the vehicle service brakes in an applied position after release of the brake pedal by the vehicle driver, provided the vehicle had been brought to a stop and left in gear with the engine running.

It is a further object of this invention to provide an anti-creep device for fluid drive vehicles which will be instantaneous in operation and one that will not interfere in any way with the normal operation of the vehicle.

It is a further object of this invention to provide a simple, economical, highly sensitive, control device which is responsive to engine and vehicle speed and which is adapted to replace the more complicated and more expensive governor control devices now used to accomplish automatic operation of engine driven machines or the like. This control device may be used not only in a brake holding device but is foreseeably usable to accomplish automatic changes in speed ratio drive in a transmission mechanism, to cause actuation of brake, clutch or fuel devices and many other related mechanisms.

It is another object of this invention to provide a control circuit having a single switch means responsive to engine and vehicle speed which switch means has no connection with the foot accelerator, therefore no additional load is imposed on the accelerator as an incident to operation of the switch means.

It is a further object of this invention to provide a control circuit for a no-creep device adapted for use with a slip-drive power transmitting mechanism wherein an engine intake manifold vacuum operated switch is combined with a brake pedal operated switch to provide a means for automatically controlling the no-creep device.

It is a further object of this invention to provide a brake holding device which automatically sets the brakes when bringing the vehicle to a stop and automatically releases the brakes when the vehicle driver initiates action to set the car in motion, the brake setting and releasing action being so smooth that the vehicle driver is unawares of the action of the brake holding device.

A further object of this invention is to provide an automatically operable no-creep device which will also function as an anti-roll back or hill-holding device, the device being such that its operation requires no conscious effort on the part of the vehicle operator.

It is a further object of this invention to provide an automatically operable brake holding device which may be easily connected to the standard fluid pressure operated braking system of a fluid drive motor vehicle without necessitating any major changes or alterations to the existing vehicle mechanisms. This device is such that it may be supplied as an accessory for, or as an integral part of, the standard fluid pressure braking system now furnished on most motor vehicles.

It is a further object of this invention to provide a control means for an automatically operable brake holding device which makes vehicle driving more pleasant and less tiring due to the fact that the vehicle driver is not required to hold the service brakes applied to prevent unintended movement of the vehicle after the vehicle has once been brought to a stop and left in gear with the engine idling. In vehicles equipped with a fluid coupling or a fluid transmission or any form of slip-drive power transmitting device this point is of particular significance in that the vehicle may be brought to a stop, left in gear with the engine running and still the vehicle will not move from its stopped position even though the vehicle driver releases the brake foot pedal. When it is desired to subsequently set the vehicle in motion the vehicle driver need only depress the foot accelerator and the brake holding device will be automatically released and the vehicle will accelerate smoothly without so-called "freight train" jerkiness.

Another object of this invention is to provide an automatically operable brake holding device which is so constructed that it will in no way interfere with the use of the service brakes to retard movement of the vehicle when the vehicle is moving above a predetermined minimum speed.

Other objects and advantages of my invention will become apparent from the following description taken in connection with the accompanying drawings, in which:

Fig. 1 is a schematic view of a fluid pressure operated braking system and the other pertinent parts of a motor vehicle drive train having associated therewith my improved brake holding device;

Fig. 2 is an enlarged, fragmentary, side elevational view, partly in section, of certain of the elements of the brake holding device constituting this invention;

Figure 3:
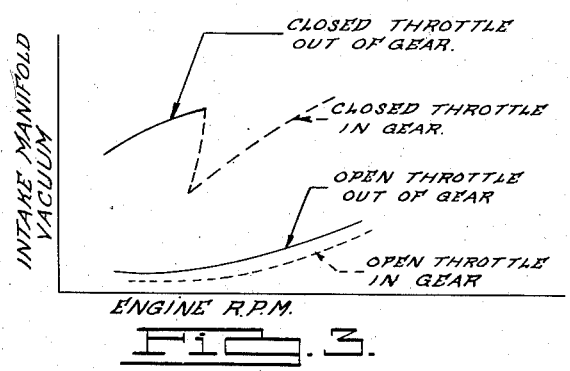
Figure 4:
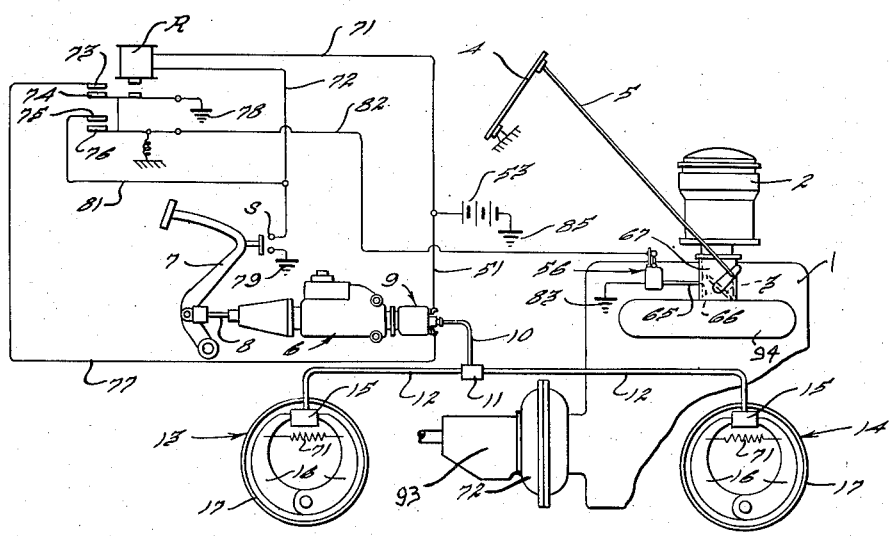

Fig. 3 a graph representing the relationship between intake manifold vacuum and engine speed, the several curves showing the effect on intake manifold vacuum both when the vehicle is in gear and in a neutral condition; and Fig. 4 is a schematic view of a modified form of control mechanism operable as a brake holding device.

Referring to the drawings in detail, 1 indicates a vehicle engine having the usual carburetor 2 controlled by a throttle valve 3 to permit variation in the amount of fuel fed to the engine. The valve 3 is actuated by an accelerator pedal 4 pivotally mounted in the vehicle driver's compartment and connected to the valve 3 by a linkage rod 5. The engine drives the wheels of the vehicle through the usual change speed gearing, clutch and/or fluid coupling hydrokinetic torque converter, or magnetic clutch, and the propeller shaft and differential gearing, as is well known in the art. A fluid coupling 72 has been indicated schematically in Fig. 1, between the engine 1 and the change speed transmission 93.

The braking system of the vehicle is schematically shown in Fig. 1, and comprises a brake master cylinder 6, the piston (not shown) of which is actuated by the pivotally mounted brake pedal 7 through a piston rod 8, said pedal 7 being mounted in the vehicle driver's compartment. Fitted to the outlet end of the brake master cylinder 6 is the solenoid actuated control valve unit 9 of this brake holding device. The brake lines include a fluid pressure conduit 10 connected to the outlet end of the valve unit 9 and to a fitting 11 from which supply conduits 12 branch out to supply pressure fluid to the wheel brake units 13 and 14 (only two of which are shown). Each of these wheel brake units comprises an actuating fluid motor or wheel cylinder 15 for the associated brake shoes 16 whereby the shoes 16 may be moved into braking engagement with the associated brake drum 17 carried by a vehicle wheel (not shown).

The brake holding valve unit 9, interposed between the brake master cylinder 6 and supply conduit 10, provides means whereby pressure fluid can be trapped in the wheel cylinders 15 of the wheel braking units to maintain the brakes applied after braking pressure has been removed from the brake pedal 7 and the pedal has returned to its released position. This specific valve unit 9 is described and claimed in the application of Donald A. Baird, Serial No. 787,957, filed November 25, 1947. It will be noted that the valve unit 9 is directly connected to the outlet end of the master cylinder 6 and to the conduit 10 by means of simple, inexpensive, leakproof, screw connections. Such connections do not require packing glands or the like and therefore provide a closed brake system that is safe and permanent.

As clearly shown in detail in Fig. 2, valve unit 9 comprises a substantially cylindrical casing member 18 about which is mounted a solenoid coil 30. Casing 18 is pierced by a bore 20 and mounted in the bore 20 of the casing member 18 is the plunger control valve member 40. Plunger member 40 constitutes an armature which is adapted to reciprocate in the bore 20 of the casing 18. Snap ring 19 and casing end member 21 limit the reciprocatory movement of the plunger member 40 in the bore 20 of the casing member 18. Casing end member 21 is provided with a raised lip portion 22 which constitutes a valve seat adapted to be engaged by the resiliently faced end portion 23 of the plunger control valve 40 when valve member 40 is moved towards the end member 21. Plunger valve member 40 is of such material that it is responsive to energization of the solenoid 30. Energization of solenoid 30 moves plunger valve 40 towards end member 21 and lip 22 seals against the resiliently faced portion 23 of valve 40. Plunger valve 40 is provided with a longitudinally extending by-pass channel 41 adapted to provide a passageway for the flow of pressure fluid from master cylinder 6 to conduit 10 when the plunger 40 is not being held against the lip 22 of the end member 21. When the valve member 40 does not seal the passageway to the outlet port 43 in end member 21 then the by-pass channel 41 provides a passageway which allows pressure fluid to pass directly from the master cylinder 6 to the conduit 10 without going through the spring-pressed, by-pass and relief valve assembly 25. Valve assembly 25 is mounted in the bore 24 of the plunger valve member 40. Plunger valve member 40 is provided with the longitudinally extending bore 24 so as to afford a passageway for the flow of pressure fluid to the wheel brakes when the portion 23 of plunger valve 40 is being held in seated engagement with the lip 22 of the end member 21 thereby sealing off passageway 41. The plunger bore 24 is enlarged at one end to provide a chamber to receive the combination spring-pressed, by-pass and relief valve assembly 25. This valve assembly 25 comprises a cup-shaped valve seat member 26, having an orifice 26' therethrough, the orifice being adapted to be normally closed by the spring-pressed, ball-type, relief valve 27. The valve seat member 26 has a radially extending flange portion 28 which is adapted to be urged, by spring 31, against the resiliently faced valve seat portion 29 of the plunger member 40. The spring-pressed flange 28 and the seat 29 constitute a by-pass valve for plunger control valve 40 when the control valve 40 is seated on the lip 22 of end member 21.

When the solenoid 30 is de-energized there are no electro-magnetic forces which tend to force the plunger valve 40 against the sealing lip 22 to close off passageway 41. Accordingly, pressure fluid may flow to the wheel cylinders from the master cylinder 6 through the by-pass channel 41 and the open control valve port 43. If on application of the brakes the pressure fluid from the master cylinder should force the plunger member 40 against the sealing lip 22 then pressure fluid can still pass to the wheel cylinders through the by-pass valve 28 of the valve assembly 25. Continued application of braking pressure after passageway 41 is closed by valve 40 will raise the flange portion 28 of the member 26 off the valve seat 29, against the pressure exerted by the spring 31, and then pressure fluid passes through the plunger bore 24 and port 43 to the brake lines. When solenoid 30 is energized electro-magnetic forces urge the plunger valve member 40 against the lip 22 and then with the by-pass channel 41 closed the pressure fluid must pass through the by-pass valve 28 of the valve assembly 25 of the plunger valve 40 as already set forth. If the plunger valve 40 traps pressures in the brake lines in excess of the pressure exerted by the spring 33 of the ball-type, relief valve 27, then relief valve 27 is backed off its seat until the pressure trapped in the brake lines has been reduced to the value desired to be maintained in the lines for brake holding purposes. It has been found that approximately 120 pounds per sq. in. pressure in the brake lines is adequate to prevent creep of a motor vehicle equipped with a fluid drive mechanism yet such a trapped braking pressure is not enough to produce an objectionable deceleration when the vehicle is being brought to a stop. A trapped braking pressure of 120 pounds will also release rapidly enough in starting up to prevent a "freight train" start.

The by-pass valve of the combination valve assembly 25 also provides means for raising the trapped brake line pressure to the relief valve pressure after the valve 40 has been closed due to energization of the solenoid coil 30.

The brake holding device and control circuit constituting the invention claimed in this application is an improvement on the invention described and claimed in the application of Robert L. Mayrath, Serial No. 786,277, filed November 15, 1947, now U. S. Patent Number 2,522,835. As shown in Fig. 2 one end of the solenoid coil 30 is connected by a conductor 51 to ground at 85 through a source of electrical energy such as battery 53. The other end of solenoid coil 30 is connected by conductor 54 to the contact 55 of vacuum governor switch 56. Contact 55 is an elongated, bar-like member comprising a metallic conductor portion 55a interposed between two insulator portions 55b and 55c. The vacuum governor switch 56 comprises a metallic casing 60 having a flexible, resilient diaphragm 61 mounted therein so as to divide the casing into two chambers. The chamber 62 on one side of the diaphragm 61 is connected to the atmosphere through ports 60'. The chamber 64 on the other side of the diaphragm 61 is connected to a portion of the engine intake manifold 94 by means of tubing 65, which forms a conduit from the port 66 in the throat 67 of the carburetor 2, to the chamber 64 of switch 56. The diaphragm 61 of the vacuum switch 56 mounts a roller-type switch contact 63. The roller 63a of contact 63 is adapted to roll across the face of contact member 55 as diaphragm 61 is reciprocably flexed. When contact roller 63a rests on conductor portion 55a of the contact 55 then the switch 56 is closed and a lead to ground is provided for the electrical circuit that energizes the solenoid 30. When contact roller 63a is positioned either above or below the conductor portion 55a of contact 55, so as to rest on insulator portion 55b or 55c respectively, then switch 56 is open and there is no ground for the solenoid circuit and coil 30 remains de-energized. The stem of contact 63 bears against the casing shell 60 where it pierces the casing shell and the base of contact 63 is also connected to the casing shell through the metallic compression spring 68. The shell casing 60 provides a ground at 83 for the solenoid circuit. Spring 68 normally tends to urge the diaphragm 61 outwardly towards the contact 55. As a vacuum builds up in the chamber 64 of switch 56 the effect of the spring 68 is partially overcome and the atmospheric pressure in chamber 62 tends to compress the spring 68 and move diaphragm 61 inwardly towards the bottom of the casing 60. It is obvious that as the vacuum varies in the chamber 64 of switch 56 the diaphragm 61 will roll contact 63a along contact bar 55 and make and break the circuit for the solenoid 30 depending on the position of contact 63a on contact bar 55.

As previously mentioned, the chamber 64 of switch 56 is connected to the port 66 in the throat 67 of downdraft-type carburetor 2. The throat 67 forms an extension of the engine fuel intake manifold 94. Port 66 is located in the throat or intake riser of the carburetor, just below the closed throttle position of the throttle valve 3. Due to the positioning of the port 66 on the downstream or intake side of the throttle valve 3, a vacuum effect is provided for operation of the switch 56 when the throttle valve 3 is closed. However, as soon as the throttle valve is opened, even a slight amount, then the chamber 64 of switch 56 is connected to the atmosphere and the vacuum in chamber 64 is reduced to such an extent that spring 68 can then urge the diaphragm 61 and switch contact 63 outwardly. It is obvious that contact 63 will remain in its outward position for all open throttle positions of the valve 3 and that the throttle valve 3 must be closed before contact 63 can be retracted to a point where it will energize the circuit for solenoid 30.

It will be noted that there is no direct connection between the foot accelerator 4 and the control switch 56 consequently there is no load imposed on the foot accelerator due to operation of the switch 56.

The brake holding device constituting this invention makes use of the fact that when a motor vehicle equipped with a fluid coupling is stopped, or nearly stopped, and left in gear with the clutch engaged, the engine idling and the throttle valve closed, that then the intake manifold vacuum is approximately three inches of mercury less than when the transmission is in neutral with the engine idling and the throttle valve closed. This difference in vacuum is due to the drag of the coupling runner and other connected elements being driven by the coupling runner as a result of the transmission being in gear.

When the throttle valve 3 is in any open position the vacuum in chamber 64 of switch 56 is not sufficient to hold contact 63 in a retracted position and spring 68 moves the diaphragm and the contact roller 63a outwardly so that it comes to rest on insulator position 55b of contact 55. In such a position the electrical circuit for solenoid 30 has no ground and accordingly the brake holding device is never operative when the throttle valve is in any open position.

When the throttle valve 3 is closed, the engine idling, and the vehicle not in gear, then there is a high vacuum that depresses the diaphragm 61 of the switch 56 and causes contact 63 to be retracted to a position such that contact roller 63a rests on insulator portion 55c of contact 55. Under such conditions the electrical circuit for the solenoid 30 has no ground and the brake holding device is inoperative.

When the throttle valve is closed and the vehicle is coasting in gear then there is a sufficient vacuum to hold the contact 63a on insulator portion 55c of contact 55 and the brake holding device is again inoperative.

It is only when the throttle valve is closed, the vehicle stopped, the engine idling and the transmission in gear, that the closed throttle vacuum is reduced to such a degree that the contact roller 63a is partially retracted from its outward position on insulator portion 55b to a position such that the roller 63a rests on the conductor portion 55a of contact 55. Positioning of roller contact 63a on contact 55a provides a ground for the solenoid electrical circuit and this energizes the solenoid and moves the control valve member 40 to closed position thereby trapping pressure fluid in the brake lines and activating the no-creep, brake holding device.

By the construction herein disclosed it is possible to control the operation of the brake holding device due to the relationship between certain ranges of intake manifold pressure and the speed of the engine and the vehicle as well as the condition of the carburetor throttle valve and the transmission. This construction automatically coordinates the several variables herein mentioned and provides a control circuit requiring only a single switch. This circuit is simple, accurate, and economical to manufacture, install and operate.

When control valve 40 is closed then the pressure trapped in the brake lines will be only as high as the highest brake pressure applied after the valve 40 has been moved to closed position and in no case will the pressure trapped in the brake lines exceed the limiting pressure of the solenoid relief valve 27 which is controlled by the compression spring 33. As previously mentioned a relief valve spring pressure of approximately 120 pounds per square inch has been found most satisfactory for motor vehicles on which this device has been installed.

The no-creep device herein disclosed functions as follows: When the vehicle is operating with an opened throttle valve the contact 63a is on insulated portion 55b of contact 55 and the circuit through the solenoid 30 is broken so the brake system functions in the normal manner due to the solenoid control valve 40 being open. With solenoid 30 deenergized the plunger valve 40 is not held against the valve seat 22 for the brake shoe springs 71 force the pressure fluid back through the brake lines to the master cylinder and hold the valve member 40 off the seat 22. When the vehicle is brought to rest and left in gear with the engine idling and the throttle valve closed the vacuum in chamber 64 of switch 56 is reduced to such an extent that contact 63a is moved to a position on conductor portion 55a of contact 55 and the solenoid coil 30 becomes energized and control valve 40 closes to trap brake fluid in the brake lines and hold the brakes applied with a pressure of not exceeding approximately 120 pounds per square inch. Trapping of such a pressure in the brake lines prevents creep of the vehicle. When it is desired to accelerate the vehicle the driver need only depress the accelerator pedal and this will automatically open the throttle valve and destroy the vacuum on the downstream side of the throttle valve 3 and in chamber 64 and move contact 63a outwardly so that it comes to rest on insulated portion 55b of contact 55 and this simultaneously deenergizes the solenoid 30 and opens the control valve 40. The opening of the control valve 40 releases the trapped fluid in the brake lines and the vehicle is accelerated as the accelerator pedal is depressed. It is obvious that if the throttle valve 3 is closed and the vehicle speed drifts down below 2 or 3 miles per hour so as to close the contacts of vacuum switch 56 and close control valve 40, still, the brakes will not be set unless the brake pedal is subsequently depressed to stop the vehicle or slow it down for there will be insufficient pressure in the brake lines to move the brake shoes against the brake drums. Consequently, a vehicle may coast at a very slow speed without having the brakes applied and immediately upon depression of the foot accelerator the throttle valve will be opened and the vehicle will be accelerated without any interference from the no-creep device.

As the brakes are automatically held applied when the vehicle is brought to a stop and left in gear with the engine idling, it is obvious how this device functions as a hill-holding device as well as a no-creep device.

Fig. 3 is a graph showing the relationship between intake manifold vacuum and engine speed for an engine driven vehicle equipped with a fluid drive. The several curves graphically compare the values of intake manifold vacuum when the transmission is in a neutral condition and when it is in gear, both under open throttle and closed throttle operating conditions. This graph clearly shows the effect on intake vacuum caused by bringing the vehicle to a stop and leaving it in gear with a closed throttle and the engine idling.

Fig. 4 is a modified form of control circuit, similar to that shown in Fig. 1, but including in addition a relay R and a brake pedal controlled switch S connected in parallel with the solenoid operated valve unit 9 and vacuum switch 56. When braking pressure is applied to the brake pedal 7 the switch S is closed and a circuit is completed from battery 53 through conductor 71, relay R, conductor 72, switch S, and then to ground at 79. This circuit energizes relay R and closes the contacts 73, 74 and 75, 76. Closing of contacts 73, 74 completes a circuit from battery 53 through conductor 51, valve unit solenoid 30, conductor 77, switches 73 and 74 and then to ground at 78. This circuit energizes solenoid 30 and closes control valve 40 thereby trapping pressure fluid in the brake lines. If during the time the relay R is energized, due to the closing of the brake pedal switch S, the vacuum switch 56 is also closed, then a parallel circuit for energization of relay R is provided. This circuit is from battery 53 through conductor 71, relay R, conductor 72, conductor 81, contacts 75 and 76, conductor 82, switch 56 and then to ground at 83. On completion of this latter circuit release of the brake pedal 7 and opening of switch S will not de-energize the relay R or the solenoid 30 of valve unit 9 and the brakes will be retained in applied position with a pressure not exceeding approximately 120 pounds per square inch. Subsequently, when switch 56 is opened, due to changes in the intake manifold vacuum, the circuits controlling relay R and valve unit solenoid 30 are broken and the brake holding device is rendered inoperative due to opening of control valve 40. The brake holding device can subsequently be rendered operative only by closing of the brake pedal switch S and completing the cycle set forth above.

Briefly the operation of the circuit shown in Fig. 4 is as follows: When the brakes are applied the relay R is energized and this simultaneously energizes the solenoid 30 of valve unit 9 and closes the control valve 40. If vacuum switch 56 is closed during the time relay R is energized then the relay remains energized and the brakes are held applied even though the brake pedal 7 is released. The brakes remain applied as long as the vacuum switch 56 is closed. When the intake manifold vacuum causes the switch 56 to open then the brakes are automatically released and the brake system functions in the normal manner until the cycle for energizing the brake holding device 9 is once again completed.

The brake holding device shown in Fig. 4 is simple and foolproof and is readily adapted for connection to the existing brake and electrical systems of most motor vehicles due to the fact that a brake switch S is already installed in most motor vehicle electrical systems in the form of a brake actuated to stop light switch.

I claim:

1. A brake holding device for a motor vehicle having an engine equipped with a carburetor which includes a throttle valve, an engine driven member, a fluid coupling connected between said engine and driven member, a system of fluid pressure operated brakes including a brake pedal, an electro-magnetically operated control member associated with said brake system and adapted, when energized, to trap pressure fluid in said system to retain the brakes in applied position after braking pressure has been removed from said pedal, an electrical circuit for operating said control member comprising a brake pedal operated switch adapted to be closed on application of the brakes, closing of said switch causing energization of said control member, and a vacuum actuated switch adapted, when closed, to retain said control member in an energized condition after braking pressure has been removed from said brake pedal, and means connecting said vacuum switch to said carburetor on the intake side of said throttle valve, said vacuum switch being arranged such that the difference in intake manifold vacuum between drive transmitting and no-drive operation of said engine at closed throttle, causes said vacuum switch to close to thereby trap pressure fluid in said system and retain the brakes applied.

2. A brake holding device for a motor vehicle having an engine equipped with a carburetor which includes a throttle valve, an engine driven member, a fluid coupling connected between said engine and driven member, a system of fluid pressure operated brakes including a brake pedal, an electro-magnetically operated control member associated with said brake system and adapted, when energized, to trap pressure fluid in said system to retain the brakes in applied position after braking pressure has been removed from said pedal, an electrical circuit for operating said control member comprising a brake pedal operated switch and a vacuum operated switch connected in parallel, and means connecting said vacuum operated switch to said carburetor on the intake side of said throttle valve, said vacuum operated switch being adjusted so as to cause said control member to remain energized, after cessation of manual braking effort, when said throttle valve is closed and said engine is transmitting drive to said driven member.

3. A brake holding device for a wheeled motor vehicle having an engine, a driven structure, and a slip-drive power transmitting device drivingly connected between said engine and said driven structure, a fuel intake manifold for said engine including a carburetor having a throttle valve mounted in the throat thereof, and a system of manually applied, pressure fluid operated wheel brakes including a master cylinder, a wheel brake cylinder, and conduit means connecting said cylinders, an electrically operated, normally open, valve connected in said conduit means adapted to be closed to trap pressure fluid in the wheel brake cylinder to retain the wheel brake in applied position after release of the said manually applied braking force, an electrical circuit for automatically operating said valve comprising a pressure operated switch connected to said carburetor throat, whereby the intake manifold pressure in the carburetor throat controls operation of said valve, said switch including a pressure actuated contact movable across a contact located between a pair of insulated portions during variation of the intake manifold pressure between predetermined limits of said manifold pressure such that the intake manifold pressure applied to the movable contact is effective to close said contacts and to automatically close said valve only when drive is being transmitted between said engine and said driven structure, the vehicle is substantially at rest and while said throttle valve is in a closed throttle position.

4. A brake holding device for a wheeled motor vehicle having an engine, a driven structure, and a slip-drive power transmitting device drivingly connected between said engine and said driven structure, a fuel intake manifold for said engine having a throttle valve mounted therein, and a system of manually applied, pressure fluid operated wheel brakes including a source of pressure fluid, a wheel brake cylinder, and conduit means connecting said pressure fluid source and said cylinder, an electrically operated, normally open, valve associated with said conduit means and adapted to be closed to trap pressure fluid in the wheel brake cylinder after release of the manually applied braking force to retain the wheel brake in applied position, an electrical circuit for automatically operating said valve comprising an energizable valve operating solenoid and a single control comprising a control operated switch, said pressure switch being connected to said intake manifold immediately the downward stream side of adjacent said throttle valve, said switch including a pressure actuated contact that is arranged to reciprocate across a switch contact located between a pair of insulated portions whereby it energizes and deenergizes said solenoid depending on the pressure in said intake manifold adjacent said throttle valve, said contacts being opened by the effect of the manifold pressure when engine drive is being transmitted to said driven member at closed throttle and closed by the effect of manifold pressure at closed throttle when drive between said engine and driven member is not being transmitted, the closing of said contacts being effective to energize said solenoid and close said valve to trap pressure fluid in said wheel brake cylinder.

5. A brake holding device for a wheeled motor vehicle provided with an engine, a fuel intake manifold for said engine including a throttle valve, a change speed transmission unit drivingly connected to said engine through a slip-drive power transmitting coupling and connected to the vehicle wheels, and a system of manually applied, pressure fluid operated brakes, a normally open, electromagnetically operated, valve associated with said brake system adapted to be actuated to a closed position to trap pressure fluid in said brake system to hold the brakes in applied position after release of the manually applied braking force, an electrical control circuit for said valve including a single pressure responsive switch to completely control actuation of said valve, and pressure transmitting means connecting said switch means to the intake manifold at a position immediately adjacent said throttle valve, said switch means including a first movable contact connected to the pressure transmitting means and a second contact arranged to be engaged by the first contact when the intake manifold pressure is intermediate its limiting values, engagement of said contacts being operative to actuate said valve to a closed position to trap pressure fluid in said brake system only when said transmission unit is arranged for the transmission of drive from said slip-drive coupling to the vehicle wheels, said motor vehicle is substantially at rest, and said throttle valve is in a closed throttle position.

6. The combination set forth in claim 5 wherein the electrically operated valve includes means whereby the pressure trapped in the brake system by closure of said valve may be increased to a predetermined value by actuation of manually operable means.

7. In combination with a wheeled motor vehicle having an engine including an engine fuel intake manifold, an accelerator operated throttle valve in said intake manifold, a driven member, a fluid power transmitting device connected between said engine and said driven member, a brake system including wheel brakes, a brake pedal, and apparatus operable by said brake pedal for manually applying said brakes, normally inactive, electrically activated means for maintaining said brakes applied after said brake pedal has been released from brake applying position, an electrical control circuit for said electrically activated means comprising an intake manifold pressure operated switch connected to said manifold adjacent said throttle valve, said switch including a first movable pressure actuated contact member and a second contact member engageable therewith when the intake manifold pressure is in a predetermined range intermediate its limiting values to thereby activate said electrically activated means only when said vehicle is being brought to a stop by said brake system with the accelerator pedal released to closed throttle position and the fluid power transmitting device drivingly connected to the driven member, the variation in manifold pressure at closed throttle between the loaded and no-load condition of the fluid power transmitting device being within said predetermined range and effective to cause engagement of said switch contacts to energize said electrically activated means to automatically maintain said brakes applied.

8. In a wheeled motor vehicle having an engine, an intake manifold therefore, an accelerator operated throttle valve mounted in said intake manifold, a driven member, a fluid power transmitting device adapted to drivingly connect said engine and said driven member, a pressure fluid operated brake system including wheel brakes, a brake pedal, and apparatus operable by said brake pedal for applying said brakes, electrically operated valve means connected to said brake system for maintaining said brakes applied after said brake pedal has been released from brake applying position, an electrical control circuit for said electrically operated valve means comprising a first switch operated by said brake pedal for in part controlling said electrically operated means, and a second intake manifold pressure operated switch arranged in parallel with said first switch for in part controlling said electrically operated means, said manifold pressure operated switch including contacts arranged to be closed only when the manifold pressure is in a predetermined range intermediate its limiting values, said brake pedal operated switch and said manifold pressure operated switch cooperating to automatically retain said wheel brakes in applied position when said vehicle is being brought to a stop by said brakes with the accelerator pedal released to closed throttle position and the fluid power transmitting device drivingly connected to the driven member.

9. In combination with a wheeled vehicle having an engine, an intake manifold therefore, an accelerator operated throttle valve mounted in said intake manifold, a driven member, a slip-drive power transmitting device adapted to drivingly connect said engine and said driven member, a pressure fluid operated brake system including wheel brakes, a manually operable brake pedal, and apparatus actuable by said brake pedal for applying said brakes, normally open, electrically operated valve means adapted to be closed for maintaining said brakes applied after said brake pedal has been released from brake applying position, an electrical control circuit for operating said valve means comprising a first switch operated by said brake pedal for in part controlling said valve means, and a second intake manifold pressure operated switch for in part controlling said valve means, said manifold pressure operated switch being arranged to be closed only when the manifold pressure is in a predetermined range intermediate its limiting values, said brake pedal operated switch and said manifold pressure operated switch cooperating to close said valve to automatically retain said wheel brakes in applied position when said vehicle is being brought to a stop with the accelerator pedal released to closed throttle position and the slip-drive power transmitting device drivingly connected to the driven member.

10. The combination with a wheeled motor vehicle having a propelling engine with an intake manifold and an accelerator operated throttle valve for controlling the intake manifold pressure and the engine speed, a driven member, a fluid power transmitting unit adapted to drivingly connect said engine and said driven member, a system of fluid pressure operated brakes comprising a master cylinder, a wheel brake cylinder, a fluid pressure conduit connecting said cylinders, a brake pedal and pedal operated means for applying said brakes, of a normally open, electrically operated, valve connected in the conduit line connecting said cylinders adapted to be closed to render inoperative the pedal operated means to release said brakes, and an electrical control circuit for operating said valve comprising an intake manifold pressure operated switch means and a brake pedal operated switch means adapted to conjointly and automatically control operation of said valve, said manifold pressure operated switch including a movable contact arranged such that variation in manifold pressure at closed throttle between load and no-load conditioning of the fluid power transmitting unit will close said switch and effect closure of the valve only after closure of said brake pedal switch by application of said brakes while said accelerator is in a closed throttle position and the fluid power transmitting unit is loaded by a drive transmitting connection between said engine and said driven member.

LOUIS B. FORMAN.

REFERENCES CITED

The following references are of record in the file of this patent:

UNITED STATES PATENTS

| Number | Name | Date |
|---|---|---|
| 2,272,320 | Freeman | Feb. 10, 1942 |